United States Patent
Eriksson et al.

(10) Patent No.: US 11,161,187 B2
(45) Date of Patent: Nov. 2, 2021

(54) CUTTING INSERT AND SHOULDER MILLNG TOOL

(71) Applicant: SANDVIK INTELLECTUAL PROPERTY AB, Sandviken (SE)

(72) Inventors: Thomas Eriksson, Falun (SE); Jorgen Jansson Udd, Gavle (SE)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 234 days.

(21) Appl. No.: 16/472,703

(22) PCT Filed: Nov. 10, 2017

(86) PCT No.: PCT/EP2017/078860
§ 371 (c)(1),
(2) Date: Jun. 21, 2019

(87) PCT Pub. No.: WO2018/114134
PCT Pub. Date: Jun. 28, 2018

(65) Prior Publication Data
US 2019/0366452 A1 Dec. 5, 2019

(30) Foreign Application Priority Data
Dec. 22, 2016 (EP) .................................. 16206443

(51) Int. Cl.
*B23C 5/06* (2006.01)
*B23C 5/02* (2006.01)
(Continued)

(52) U.S. Cl.
CPC ................ *B23C 5/06* (2013.01); *B23C 5/207* (2013.01); *B23C 5/22* (2013.01);
(Continued)

(58) Field of Classification Search
CPC ....... B23C 2200/0411; B23C 2200/128; B23C 2200/201; B23C 2200/205;
(Continued)

(56) References Cited

U.S. PATENT DOCUMENTS 5,876,160 A * 3/1999 Johnson .................. B23C 5/202
409/132
9,266,175 B2 * 2/2016 Jaeger ..................... B23C 5/109
(Continued)

FOREIGN PATENT DOCUMENTS

JP 2013176834 A * 9/2013 ............. B23C 5/109
WO 2014006609 A1 1/2014
(Continued)

*Primary Examiner* — Nicole N Ramos
(74) *Attorney, Agent, or Firm* — Corinne R. Gorski (57) ABSTRACT

A cutting insert for a shoulder milling tool has a trigonal shape and includes a first surface, a second surface, and a circumferential surface extending between the first surface and the second surface. The circumferential surface includes a countersunk circumferential waist portion. The circumferential surface has a first and a second clearance surface extending along a first and a second main cutting edge. Each of the first and second clearance surfaces forma a negative nominal clearance angle. Each of the first and second main cutting edges is arranged inside the countersunk circumferential waist portion, as seen in the view towards the first and second surfaces, respectively.

8 Claims, 9 Drawing Sheets (51) Int. Cl.
*B23C 5/20* (2006.01)
*B23C 5/22* (2006.01)

(52) U.S. Cl.
CPC .. *B23C 2200/201* (2013.01); *B23C 2200/208* (2013.01); *B23C 2200/286* (2013.01); *B23C 2210/168* (2013.01)

(58) Field of Classification Search
CPC ........ B23C 2200/208; B23C 2200/286; B23C 2210/16816; B23C 5/06; B23C 5/207; B23C 5/22; B23C 5/2221; B23B 2205/12; B23B 2205/00
See application file for complete search history.

(56) References Cited

U.S. PATENT DOCUMENTS

| | | | | |
|---|---|---|---|---|
| 2013/0142580 A1* | 6/2013 | Konta | ...................... | B23C 5/109 407/100 |
| 2013/0156515 A1* | 6/2013 | Satran | ....................... | B23C 5/06 407/48 |
| 2014/0010605 A1* | 1/2014 | Smilovici | ............... | B23C 5/207 407/42 |
| 2015/0165532 A1* | 6/2015 | Yamamoto | ............... | B23C 5/207 407/67 |
| 2015/0190868 A1 | 7/2015 | Koifman et al. | | |
| 2015/0190869 A1* | 7/2015 | Roman | ..................... | B23C 5/06 407/42 |
| 2015/0266100 A1* | 9/2015 | Okamura | .............. | B23B 27/145 407/66 |
| 2016/0082528 A1 | 3/2016 | Ballas | | |
| 2016/0375506 A1* | 12/2016 | Koike | ................... | B23C 5/2221 407/48 |
| 2017/0080503 A1* | 3/2017 | Koike | ..................... | B23C 5/006 |
| 2017/0189972 A1* | 7/2017 | Matsumura | ............... | B23C 5/06 |
| 2017/0282262 A1* | 10/2017 | Burtscher | .............. | B23C 5/207 |
| 2018/0257154 A1* | 9/2018 | Wihlborg | ............... | B23C 5/006 |
| 2019/0321898 A1* | 10/2019 | Eriksson | ................ | B23C 5/207 |

FOREIGN PATENT DOCUMENTS

| | | | |
|---|---|---|---|
| WO | 2015174200 A1 | 11/2015 | |
| WO | 2015198812 A1 | 12/2015 | |
| WO | WO-2015198812 A1 * | 12/2015 | ........... B23C 5/2243 |

* cited by examiner

CUTTING INSERT AND SHOULDER MILLNG TOOL

RELATED APPLICATION DATA

This application is a § 371 National Stage Application of PCT International Application No. PCT/EP2017/078860 filed Nov. 10, 2017 with priority to EP 16206443.0, filed Dec. 22, 2016.

TECHNICAL FIELD AND BACKGROUND

The present invention relates to a cutting insert for a shoulder milling tool. The present invention further relates to a shoulder milling tool.

One or more cutting inserts are secured to a shoulder milling tool. In a shoulder milling operation, the shoulder milling tool is rotated and fed into a workpiece, wherein a cutting edge of each of the one or more cutting inserts enters into cutting engagement with the workpiece for milling a shoulder therein.

Cutting inserts are available in various different shapes, some of which are indexable, i.e. they comprise more than one useable cutting edge and may be secured in different index positions to the shoulder milling tool. The indexable cutting insert may also be double-sided, i.e. they comprise indexable cutting edges on a first or upper surface as well as a second or lower surface to provide even further useable cutting edges. A cutting insert having a generally hexagonal shape comprising three 90 degree corners is referred to as a trigonally shaped cutting insert.

WO 2015/174200 discloses a trigonally shaped and double-sided cutting insert comprising: a first surface and a second surface which each have a hexagonal shape and which are disposed back-to-back, lateral surfaces that run to the first surface and the second surface, and cutting edges that are respectively formed by a ridgeline at a position where the first surface and the lateral surfaces intersect, and by a ridgeline at a position where the second surface and the lateral surfaces intersect. Seat surfaces are disposed parallel and are respectively formed at the insert center side of the first surface and of the second surface; and depressions for separating the lateral surface that runs to the first surface and the lateral surface that runs to the second surface. The cutting edges are formed of a first cutting edge and a second cutting edge. The first cutting edge is longer than the second cutting edge. An end of the first cutting edge is in a position that is higher than the seat surface.

SUMMARY

It is an object of the present invention to provide a cutting insert for shoulder milling having an improved resistance against the formation of cracks and/or the fracture of the cutting insert.

According to an aspect of the invention, the object is achieved by a cutting insert for a shoulder milling tool. The cutting insert has a trigonal shape and a median plane extending through the cutting insert. The cutting insert comprises a first surface, a second surface, and a circumferential surface extending between the first surface and the second surface, the first and second surfaces, extending on opposite sides of the median plane. The cutting insert comprises a first cutting edge extending along an intersection between the first surface and the circumferential surface, and a second cutting edge extending along an intersection between the second surface and the circumferential surface, the first and second cutting edges, as seen in a view towards the first and second surfaces, respectively, extending along a corner of the cutting insert. The first cutting edge comprises a first main cutting edge, a first corner cutting edge, and a first surface-wiping secondary cutting edge, wherein the first main cutting edge adjoins to the first corner cutting edge, and the first corner cutting edge adjoins to the first surface-wiping secondary cutting edge. The second cutting edge comprises a second main cutting edge, a second corner cutting edge, and a second surface-wiping secondary cutting edge, wherein the second main cutting edge adjoins to the second corner cutting edge, and the second corner cutting edge adjoins to the second surface-wiping secondary cutting edge. The circumferential surface comprises a countersunk circumferential waist portion situated at the median plane. The first main cutting edge is arranged on an opposite side of the countersunk circumferential waist portion to the second surface-wiping secondary cutting edge, and the first surface-wiping secondary cutting edge is arranged on an opposite side of the countersunk circumferential waist portion to the second main cutting edge. The circumferential surface comprises a first clearance surface extending along the first main cutting edge, the first clearance surface extending at an acute angle to the median plane along the first main cutting edge, such that the first clearance surface is forming a negative nominal clearance angle. The circumferential surface comprises a second clearance surface extending along the second main cutting edge, the second clearance surface extending at an acute angle to the median plane along the second main cutting edge, such that the second clearance surface is forming a negative nominal clearance angle. The first main cutting edge is arranged inside the countersunk circumferential waist portion, as seen in the view towards the first surface, and the second main cutting edge is arranged inside the countersunk circumferential waist portion, as seen in the view towards the second surface.

The main cutting edge being arranged inside the countersunk circumferential waist portion, as seen in the view towards the first or second surface, means that the relevant main cutting edge is arranged closer to a centre of the cutting insert than the countersunk circumferential waist portion. An improved resistance against the formation of cracks and fracturing the whole cutting insert is hereby achieved by the first main cutting edge being arranged inside the countersunk circumferential waist portion. More precisely, the countersunk circumferential waist portion of the cutting insert provides a supporting amount of material (the cutting insert body) extending outside and underneath the first main cutting edge, which not only improves the resistance against crack formation in the first main cutting edge (making it stronger), but also the resistance against cracks propagating past the countersunk circumferential waist portion to the second surface (bottom) of the cutting insert. In other words, the cracks that may nevertheless arise if the first main cutting edge is subjected to excessive wear and/or large cutting forces in a shoulder milling operation are prevented from causing a failure/fracture of the whole cutting insert. Consequently, the second surface-wiping secondary cutting edge on the bottom side of the cutting insert opposite to the first main cutting edge will also remain intact even if the first main cutting edge would exhibit cracks. Moreover, a corresponding amount of material is also provided on the outside and above the second main cutting edge. This also provides an improved resistance against crack propagation through the countersunk circumferential waist portion. In other words, the second main cutting edge, which is also arranged inside the countersunk circumferential waist portion provide an improved resistance against the cracks that may arise in the first surface-wiping secondary edge by preventing them from reaching the bottom side of the cutting insert and thereby cause a similar failure/fracture of the whole cutting insert. The cutting insert hereby exhibits an improved resistance against cracks that may arise in for instance a ramping or plunge milling operation when the first surface-wiping secondary cutting edge is subjected to excessive wear and/or relatively large cutting forces. Consequently, the second main cutting edge on the bottom side opposite to the first surface-wiping secondary cutting edge will also remain intact during such cutting conditions. Accordingly, the cutting insert remains intact and the above mentioned object is not just achieved in conventional shoulder milling, but also in milling operations involving ramping and plunge milling.

Hence, the cutting insert is configured to be fixed in a seat of a shoulder milling tool for cutting a 90° shoulder in a workpiece, but a shoulder milling tool can also be used for ramping and plunge milling including a feed in an axial direction of the shoulder milling tool into the workpiece. The median plane is an imaginary plane extending centrally in between the first and second surfaces and intersects with the circumferential surface. The main cutting edge is extending in the axial direction of the shoulder milling tool and configured for cutting the 90° shoulder or wall in the workpiece, in relation to the surface-wiping secondary cutting edge, which is extending in the radial direction of the shoulder milling tool and configured for surface-wiping the workpiece surface extending perpendicularly to the axial direction of the shoulder milling tool. The trigonal shape of the cutting insert for the shoulder milling tool may hereby provide three indexable (and identical) cutting edges extending along the intersection between the first surface and the circumferential surface, each of the three indexable cutting edges extending along a (90 degree) corner of the cutting insert, wherein three further indexable cutting edges may also extend along an intersection between the second surface and the circumferential surface. In other words, a double-sided and indexable trigonally shaped cutting insert can advantageously provide a total of six indexable cutting edges to be used for shoulder milling (including ramping/plunge milling).

According to an embodiment, the first clearance surface along the first main cutting edge extends at an acute angle within a range of 83-87 degrees to the median plane, and the second clearance surface along the second main cutting edge extends at an acute angle within a range of 83-87 degrees to the median plane. In this manner, a negative nominal clearance angle within a range of 3-7 degrees is provided for each of the first and second clearance surface. This provides a suitable range for arranging the main cutting edges inside the countersunk circumferential waist portion in order to achieve the above mentioned object, while the cutting insert can be mounted at a reasonable radial rake angle for achieving a functional clearance in the shoulder milling tool during milling (further described below).

According to an embodiment, a first flat waist portion of the countersunk circumferential waist portion extends in a plane perpendicularly to the median plane at the first surface-wiping secondary cutting edge and the second main cutting edge, and a second flat waist portion of the countersunk circumferential waist portion extends in a plane perpendicular to the median plane at the second surface-wiping secondary cutting edge and the first main cutting edge. In this manner, the first and second flat waist portions in the countersunk circumferential waist portion provide suitable first and second side abutment surfaces for supporting the cutting insert, in particular a double-sided indexable cutting insert, in the seat of the shoulder milling tool. Hence, it provides well defined (flat) and protected (countersunk) first and second side abutment surfaces for supporting the cutting insert in the seat of the shoulder milling tool.

According to an embodiment, the first surface-wiping secondary cutting edge extends at an angle to the first flat waist portion, as seen in a view towards the first surface, and the second surface-wiping secondary cutting edge extends at an angle to the second flat waist portion, as seen in a view towards the second surface, in such a way that the first and second flat waist portions in relation to the first and second surface-wiping secondary edges become more countersunk toward the corner of the cutting insert. In other words, the first surface-wiping secondary cutting edge is arranged at an angular relation to the first flat waist portion and the second surface-wiping secondary cutting edge is arranged at an angular relation to the second flat waist portion to provide relatively deeper portions of the countersunk circumferential waist portion. In this manner, the first and second flat waist portions are well protected from detrimental wear during milling in an area close to the corner cutting edges where the first and second abutment surfaces for the cutting insert are suitably located as the first and second flat waist portions are more countersunk towards the corner cutting edges and grow more shallow farther away from the corner cutting edges.

According to an embodiment, the first main cutting edge extends at an angle to the second flat waist portion, as seen in a view towards the first surface, and the second main cutting edge extends at an angle to the first flat waist portion, as seen in a view towards the second surface, in such a way that the first main cutting edge is arranged at an increasing distance inside the second flat waist portion in a direction towards the first corner cutting edge, and the second main cutting edge is arranged at an increasing distance inside the first flat waist portion in a direction towards the second corner cutting edge. Thus, the first main cutting edge is extending inwards in relation the second flat waist portion as it extends towards the first corner cutting edge whereby the cutting forces are supported by a successively increasing body of the cutting insert lying underneath the first main cutting edge to enhance the protection against cracks and fracture of the first main cutting edge in proximity to the first corner cutting edge. Furthermore, in ramping or plunge milling with the first surface-wiping secondary cutting edge being subjected to relatively large cutting forces that may cause cracks in the first surface-wiping secondary cutting edge, the angle on the second main cutting edge in relation to the first flat waist portion provides an enhanced protection against cracks reaching the opposite (lower) second main cutting edge and thereby causing a fracturing of the entire cutting insert.

According to an embodiment, the cutting insert comprises in total three cutting edges of the same kind as the first cutting edge extending along the intersection between the first surface and the circumferential surface, and three cutting edges of the same kind as the second cutting edge extending along an intersection between the second surface and the circumferential surface. In this manner a double-sided and six times indexable cutting insert is provided. Since the main cutting edge of each of the six cutting edges is arrange inside the relevant countersunk circumferential waist portion, wherein the relevant waist portion for each of the six cutting edges provides improved resistance against the propagation of cracks.

According to a further embodiment, the first flat waist portion comprises a first flat abutment surface configured for abutment against an axial and/or radial support surface of the shoulder milling tool, and the second flat waist portion comprises a second flat abutment surface configured for abutment against an axial and/or radial support surface of the shoulder milling tool. In this manner, the double-sided cutting insert is configured to be axially and/or radially supported in a stable and precise manner in the insert seat of the shoulder at milling tool, and the first and second flat abutment surfaces remain intact in the countersunk circumferential waist portion in relation to the clearance surfaces, since the first and second abutment surfaces are protected from wear during milling.

It is a further object of the present invention to provide a shoulder milling tool, which utilises the cutting insert comprising cutting edges on opposite sides of the cutting insert providing improved resistance against formation of cracks and fracture of the cutting insert. Hence, according to a further aspect of the invention, this object is achieved by a shoulder milling tool comprising a tool body being provided with an insert seat for receiving a cutting insert, wherein the shoulder milling tool comprises the cutting insert according to any one of aspects and/or embodiments discussed herein arranged in the insert seat.

As discussed above, when in cutting engagement with a workpiece, the main cutting edges arranged inside the countersunk circumferential waist portion improves the resistance against cracks from forming and propagating through an adjacent countersunk circumferential waist portion, and when the surface wiping secondary cutting edges are worn down or in high cutting load engagement with a workpiece, cracks will not propagate through the countersunk circumferential waist portion to the underlying inactive main cutting edge arranged inside the countersunk circumferential waist portion. Thus, improved resistance against cracks and fracture of the cutting insert is also achieved in the shoulder milling tool. The cutting insert is hereby more reliable/safer in operation by the reduced risk of cutting insert failure/fracture for safer milling and the cutting insert can be indexed when an active cutting edge is worn out, whereby a previously inactive new cutting edge is positioned for cutting engagement with the workpiece.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

FIGS. 1a-1e illustrate various views of a cutting insert 2 according to an embodiment. The cutting insert 2 is configured for use in a shoulder milling tool. However, the cutting insert 2 may also be used for ramping or plunge milling. The cutting insert 2 is double-sided and six times indexable, i.e. the cutting insert 2 comprises six identical cutting edges in total, such that the cutting insert 2 can be mounted in six different index positions in an insert seat of the shoulder milling tool, to provide one active cutting edge at a time for milling a workpiece. The cutting insert 2 comprises a through hole 3 for screw mounting the cutting insert to the shoulder milling tool, the through hole 3 extending centrally through the cutting insert 2.

The cutting insert 2 is preferably manufactured from a cemented carbide material, but it may be manufactured from a material comprising e.g. one or more of ceramics, cubic boron nitride, polycrystalline diamond, and/or cermet. The cutting insert 2 is also preferably coated with surface coatings such as e.g. titanium nitride, titanium carbonitride, and/or aluminium oxide.

The cutting insert 2 has a trigonal shape and an imaginary median plane 4 extends through the cutting insert 2. The median plane 4 extends perpendicularly to a centre axis 5 of the through hole 3 or cutting insert 2. FIG. 1e shows a cross section through the insert 2, along the median plane 4. Seen in a view towards the median plane 4, the trigonal shape has three 90 degree angled corners 6 and three 150 degree angled corners 8 in between the 90 degree angled corners 6. A 60 degree angle 10 is formed between sides 12 of two different 90 degree angled corners 6.

The actual angles of a cutting insert may vary due to manufacturing tolerances. The surfaces are formed in pressing and sintering operations in the manufacturing of the cutting insert, wherein some surface are ground after the sintering operation. Thus, angles between surface, edges, and/or planes may have different manufacturing tolerances.

The various angles given herein may be approximately a number of degrees. In practice, the number of degrees on the actual cutting insert may depend on manufacturing tolerances, a particular chosen layout of the cutting insert and shoulder milling tool, and/or a specific part of the cutting insert requiring stricter manufacturing tolerances involving relatively small angles. Hence, in some cases, the approximate angle may vary a few degrees from the number given, such as +/−3 degrees. The advantages of different aspects and/or embodiments of the invention are present within such angular ranges. Accordingly, the above mentioned 90 degree corner, may be considered as an approximately 90 degree angled corner encompassing corner angles within a range of 87-93 degrees, and the (approximately) 150 degree angled corners may encompass corner angles within a range of 147-153 degrees, and the (approximately) 60 degree angles may encompass angles within a range of 57-63 degrees.

The insert 2 comprises a first surface 14, and a second surface 16 opposite to the first surface 14, and a circumferential surface 18 extending between the first surface 14 and the second surface 16. The first and second surfaces 14, 16 extend on opposite sides of the median plane 4. The median plane 4 extends centrally in between the first and second surfaces 14, 16 and intersects with the circumferential surface 18. Put differently, the median plane 4 extends in the middle of the insert 2 with one half of the insert 2 on each side of the median plane 4.

The through hole 3 extends through the insert from the first surface 14 to the second surface 16. Each of the first and second surfaces 14, 16 as a trigonal shape corresponding to the trigonal shape of the median plane 4 discussed above with reference to FIG. 1e. Corners of the median plane 4 and the first and second surfaces 14,16 are substantially aligned.

A cutting edge 20 extends along an intersection between the first surface 14 and the circumferential surface 18. A second cutting edge 20''' extends along an intersection between the second surface 16 and the circumferential surface 18. The first cutting edge 20, as seen in a view towards the first surface 14, see FIG. 1b, extends along a corner 22 of the insert 2. The second cutting edge 20''', as seen in a view towards the second surfaces 16, see FIG. 1c, also extends along the corner 22 of the insert 2. The corner 22 of the insert 2 is a 90 degree corner and is arranged at one of the 90 degree corners 6 of the median plane 4 shown in FIG. 1e.

The first cutting edge 20 comprises three portions; a first main cutting edge 24, a first corner cutting edge 26, and a first surface-wiping secondary cutting edge 28. The first main cutting edge 24 adjoins to the first corner cutting edge 26, and the first corner cutting edge 26 adjoins to the first surface-wiping secondary cutting edge 28. The second cutting edge 20''' comprises three portions, a second main cutting edge 24', a second corner cutting edge 26', and a second surface-wiping secondary cutting edge 28', wherein the second main cutting edge 24' adjoins to the second corner cutting edge 26', and the second corner cutting edge 26' adjoins to the second surface-wiping secondary cutting edge 28'. Each of the first and second corner cutting edges 26, 26' may have a cutting insert corner radius for forming a standard corner radius in a workpiece, such as a radius of e.g. 0.8 mm, 1.2 mm, or 1.6 mm.

The circumferential surface 18 comprises a countersunk circumferential waist portion 92 situated at the median plane 4. The first main cutting edge 24 is arranged on an opposite side of the countersunk circumferential waist portion 92 to the second surface-wiping secondary cutting edge 28', wherein the first surface-wiping secondary cutting edge 28 is arranged on an opposite side of the countersunk circumferential waist portion 92 to the second main cutting edge 24', see e.g. FIGS. 1a, 1d and 3b.

When the cutting insert 2 is arranged in a shoulder milling tool with the first cutting edge 20 arranged for cutting, the first main cutting edge 24 is extending in an axial direction of the shoulder milling tool and arranged for cutting into the workpiece, in a radial feed direction of the shoulder milling tool. The first surface-wiping secondary cutting edge 28 is extending in a radial direction of the shoulder milling tool and configured for surface-wiping the workpiece, or cutting in an axial feed direction of the shoulder milling tool. A 90° shoulder is milled in a workpiece during shoulder milling in the radial feed direction, wherein ramping or plunge milling also involves cutting in the axial feed direction of the shoulder milling tool into the workpiece. In a shoulder milling operation, the first main cutting edge 24 usually performs the major cut into the workpiece, while the first surface-wiping secondary cutting edge 28 only performs a shallow surface smoothing of the machined surface. However, during ramping or plunge milling (involving an axial feed), the first surface-wiping secondary cutting edge 28 performs a substantially deeper cut into the workpiece, in the axial direction of the shoulder milling tool, than during the shoulder milling operation. Obviously, in ramping or plunge milling, the first main cutting edge 24 may also cut into the workpiece.

When the cutting insert 2 is arranged in the shoulder milling tool with the first cutting edge 20 being active or mounted for cutting action, the second cutting edge 20''' faces rearwardly in a rotational direction of the shoulder milling tool. Hence, the second cutting edge 20''' is inactive and does not engage with the workpiece. In order to cut with the second cutting edge 20''', the cutting insert 2 has to be removed from the shoulder milling tool and indexed such that the second cutting edge 20''' becomes active and faces forwardly in the rotational direction of the shoulder milling tool.

Figure 1A:
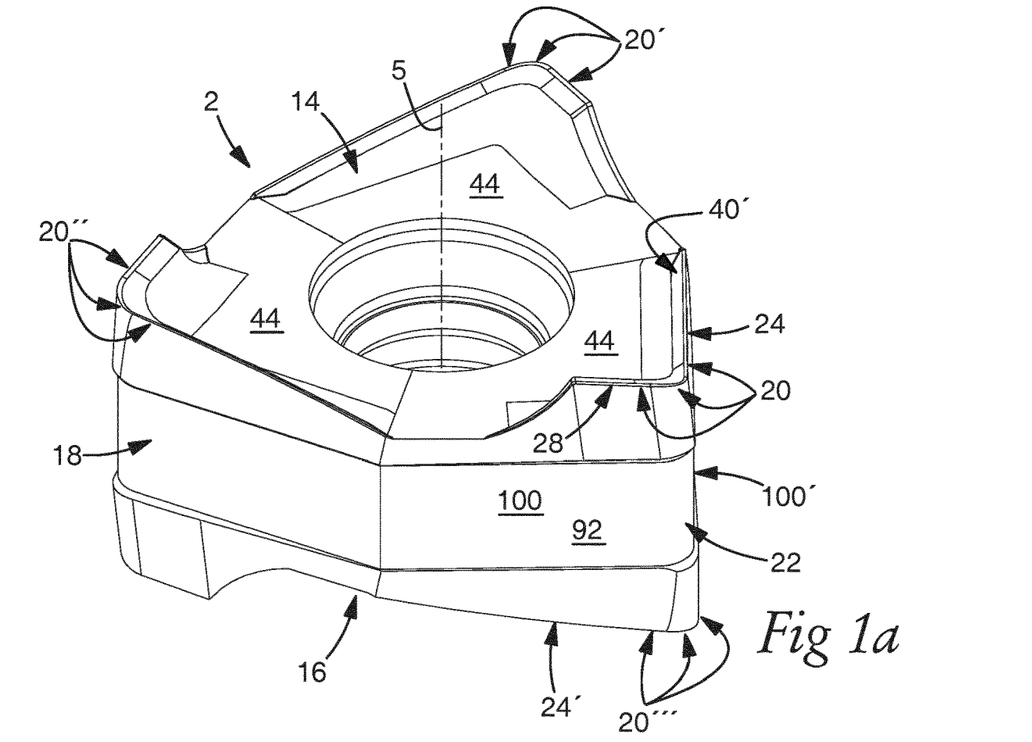
FIGS. 1a-1e illustrate various views of a cutting insert according to an embodiment.
Figure 1B:
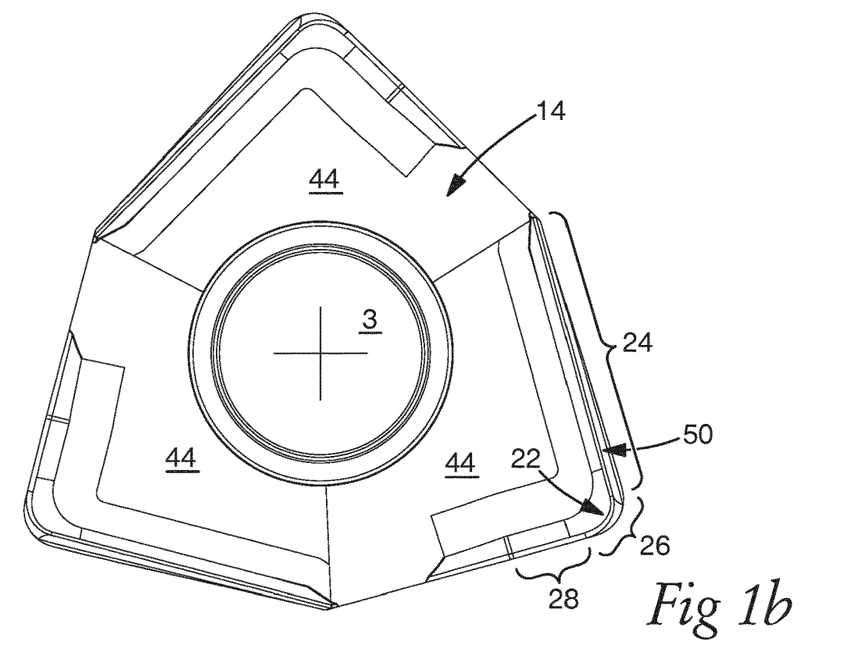
Figure 1C:
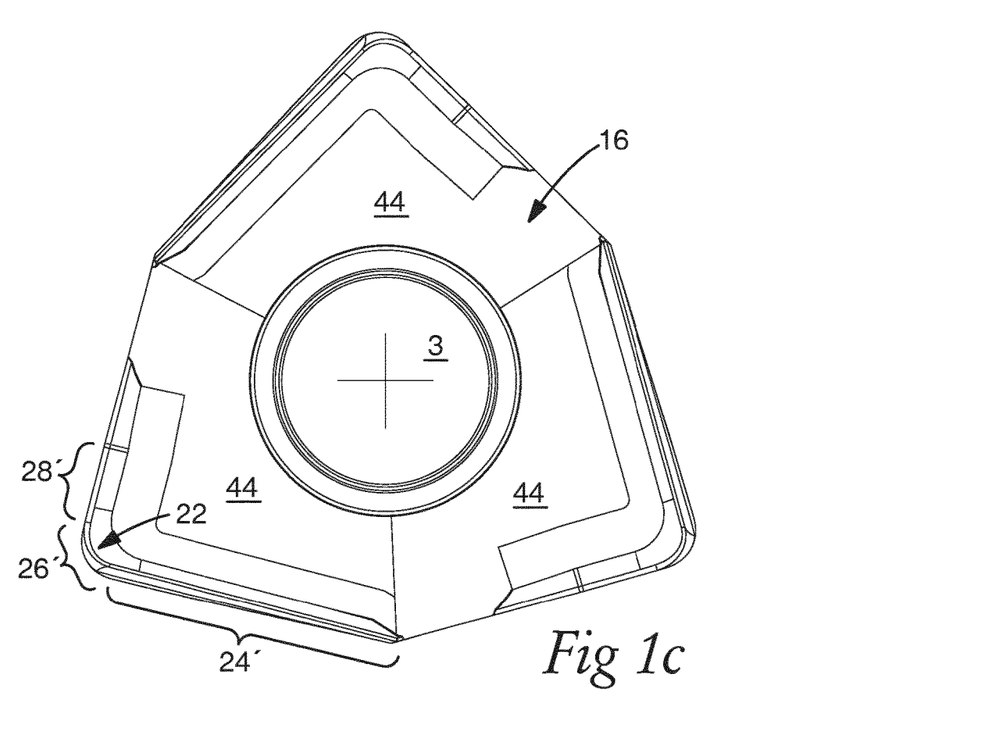
Figure 1D:
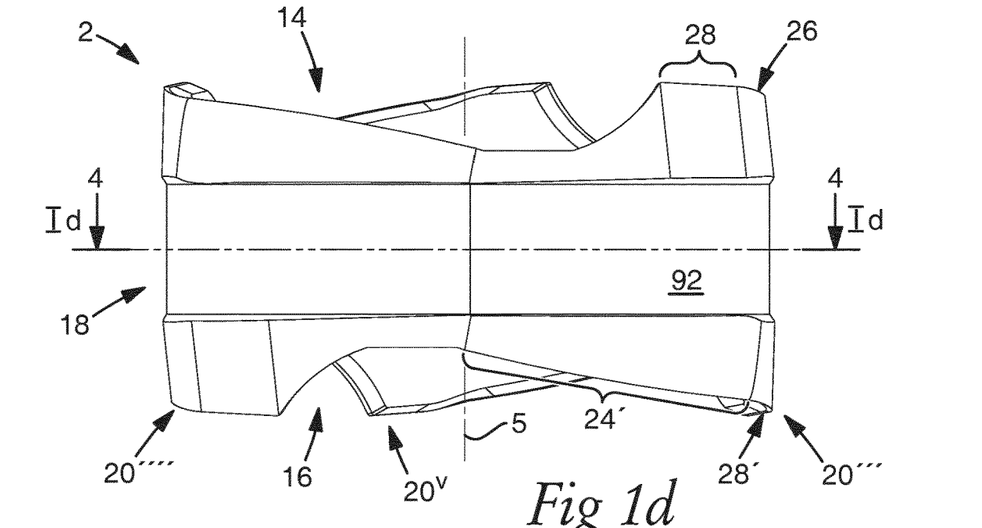
Figure 1E:
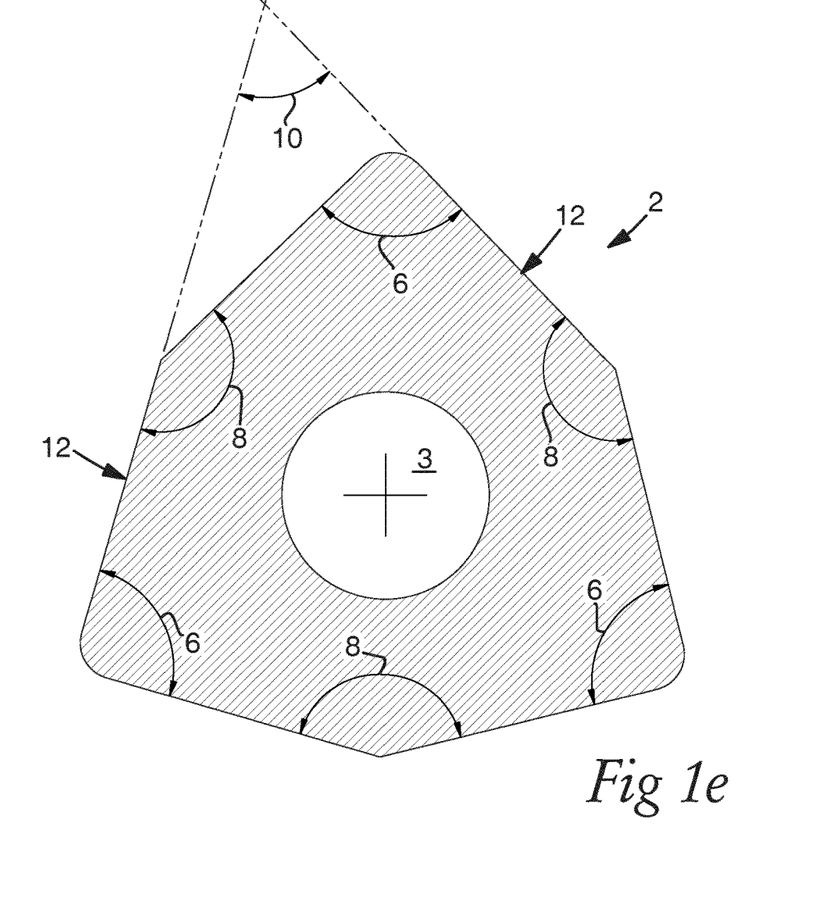

Referring to FIGS. 1a-1c, each of the first and second surfaces 14, 16 comprises a flat centre surface 44. At least a portion of the flat centre surface 44 forms an abutment surface when the first or second surface 14, 16 face the insert seat of the shoulder milling tool. Accordingly, when the flat centre surface 44 abuts against a support surface in an insert seat of a shoulder milling tool, see FIG. 5. Suitably, a radially outer portion of the flat centre surface 44 forms an abutment surface against a bottom support surface in the insert seat of the shoulder milling tool.

Figure 2A:
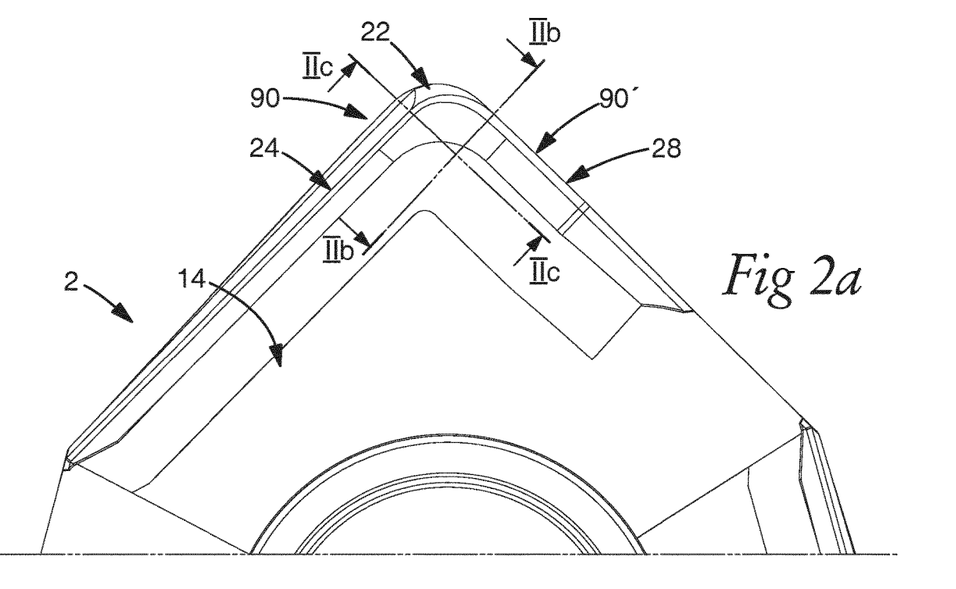
FIG. 2a illustrates a partial top view of the cutting insert of FIGS. 1a-1e, FIGS. 2b and 2c illustrate partial cross sections through the cutting insert along lines IIb-IIb and IIc-IIc in FIG. 2a, FIGS. 3a and 3b illustrate two different side views of the cutting insert of FIGS. 1a-1e, FIGS. 4a and 4b illustrate a shoulder milling tool according to an embodiment.
Figure 2B:
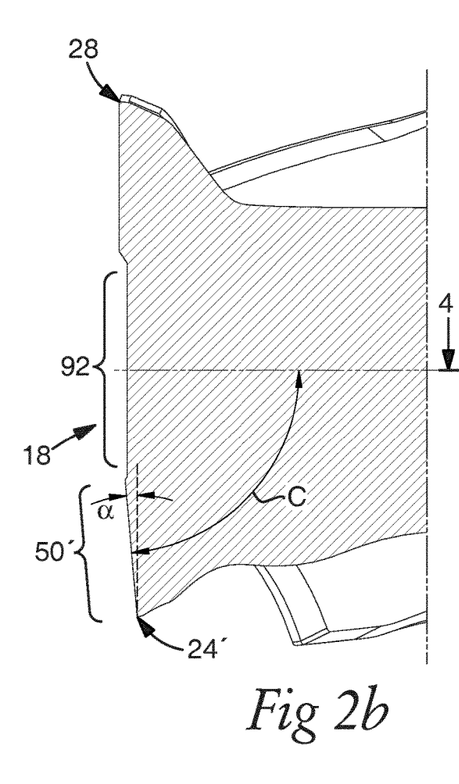
Figure 2C:
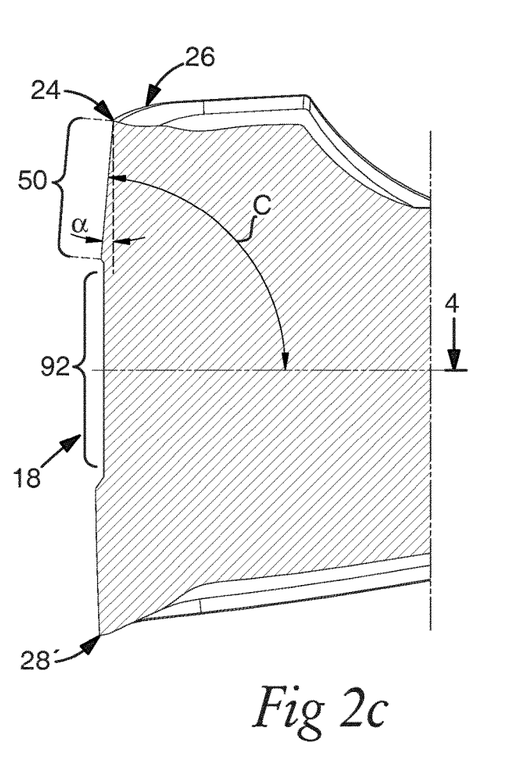

FIG. 2a illustrates a partial top view of the cutting insert 2 of FIGS. 1a-1e. FIGS. 2b and 2c illustrate partial cross sections through the cutting insert 2 along lines IIb-IIb, and IIc-IIc in FIG. 2a. The circumferential surface 18 comprises a first clearance surface 50 extending along the first main cutting edge 24. The first clearance surface 50 extends at an acute angle c to the median plane 4 along the first main cutting edge 24, such that the first clearance surface 50 along the first main cutting edge 24 is forming a negative nominal clearance angle $\alpha$. The circumferential surface 18 comprises a second clearance surface 50' extending along the second main cutting edge 24'. The second clearance surface 50' extends at an acute angle c to the median plane 4 along the second main cutting edge 24', such that the second clearance surface 50' is forming a negative nominal clearance angle $\alpha$.

The nominal clearance angle $\alpha$ is the clearance angle of the relevant clearance surface 50, 50' measured on the cutting insert 2 as such, in relation to a normal of the median plane 4. A functional clearance angle is formed when the cutting insert 2 is secured to a shoulder milling tool, see FIGS. 4a and 4b. The functional clearance angle is always positive and constitutes the clearance angle between the clearance surface of the cutting insert and the machined workpiece surface during operation of the shoulder milling tool.

The first main cutting edge 24 is arranged inside the countersunk circumferential waist portion 92, as seen in the view towards the first surface 14, see FIG. 1b. Specifically, in the highlighted portion FIG. 1b' the countersunk circumferential waist portion 92 is indicated with a broken line in relation to the first main cutting edge 24. Namely, in the view towards the first surface 14, the first clearance surface 50 conceals the countersunk circumferential waist portion 92. The second main cutting edge 24' is arranged inside the countersunk circumferential waist portion 92, as seen in the view towards the second surface 16, see FIG. 1c. Specifically, in the highlighted portion FIG. 1c' the countersunk circumferential waist portion 92 is indicated with a broken line in relation to the second main cutting edge 24'. Namely, in the view towards the second surface 16, the second clearance surface 50' conceals the countersunk circumferential waist portion 92.

In this manner, the cutting insert 2 is wider at the median plane 4 than at the first and second main cutting edges 24, 24'. Accordingly, if cracks should form in the first main cutting edge 24 during cutting with the first cutting edge 20, such cracks or fracture of the first main cutting edge 24 will be prevented by the countersunk circumferential waist portion 92 and will not tend to propagate past the countersunk circumferential waist portion 92 to the second surface-wiping secondary cutting edge 28'. Also, if cracks should form in the first surface-wiping secondary cutting edge 28 during cutting with the first cutting edge 20, such cracks or fracture of the first surface-wiping secondary cutting edge 28 will be prevented by the countersunk circumferential waist portion 92 and will not tend to propagate past the countersunk circumferential waist portion 92 to the second main cutting edge 24'. Thus, as previously described, the second surface-wiping secondary edge 28' and the second cutting edge 20''' remain intact on the cutting insert during cutting with the first cutting edge 20. Hence, the second cutting edge 20''' at the second side surface 16 of the cutting insert can be used when the cutting insert 2 is indexed, such that the second cutting edge 20''' becomes active for cutting engagement with the workpiece. Accordingly, a safe and durable indexable cutting insert 2 is provided wherein an inactive cutting edge 20-20$^V$ adjacent to an active cutting edge 20-20$^V$ is protected on the cutting insert 2.

Referring to FIGS. 2a-2c, in the shown embodiment, the first clearance surface 50 along the first main cutting edge 24 extends at an acute angle c within a range of 83-87 degrees to the median plane 4. The second clearance surface 50' along the second main cutting edge 24 extends at an acute angle c within a range of 83-87 degrees to the median plane 4. In this manner, a negative nominal clearance angle α within a range of 3-7 degrees is provided for each of the first and second main cutting edges 24, 24'. More precisely, according to the embodiment, the negative nominal clearance angle α along each of the first and second main cutting edges 24, 24' is 5 degrees, i.e. the acute angle c is approximately 85 degrees along the entire first and second main cutting edges 24, 24'.

During manufacturing of the cutting insert 2, the first and second clearance surfaces 50, 50' as well as the clearance surfaces at the first and second surface-wiping cutting edges 28, 28' may be formed in respective grinding operations. Also, the countersunk circumferential waist portion 92 may be formed in a grinding operation. According to these embodiments, the height of the countersunk circumferential waist portion 92, i.e. the length in parallel with the centre axis 5 of the cutting insert 2, is greater than a maximum height of each of the first and second clearance surfaces 50, 50', as well as greater than a maximum height of each of the clearance surfaces at the first and second surface-wiping cutting edges 28, 28'. Accordingly, the same grinding wheel can be used in each of the grinding operations.

Figure 3A:
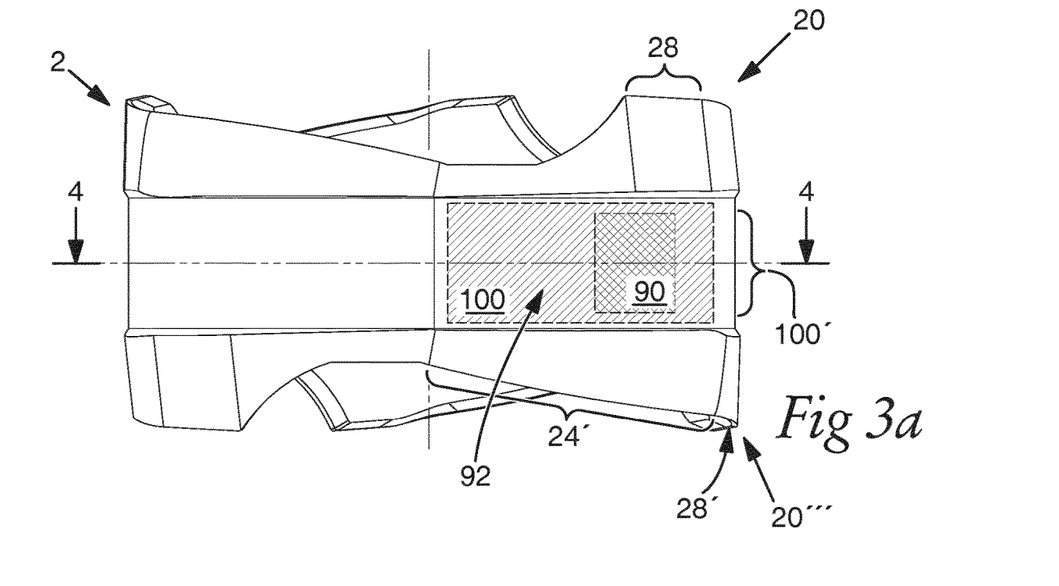
Figure 3B:
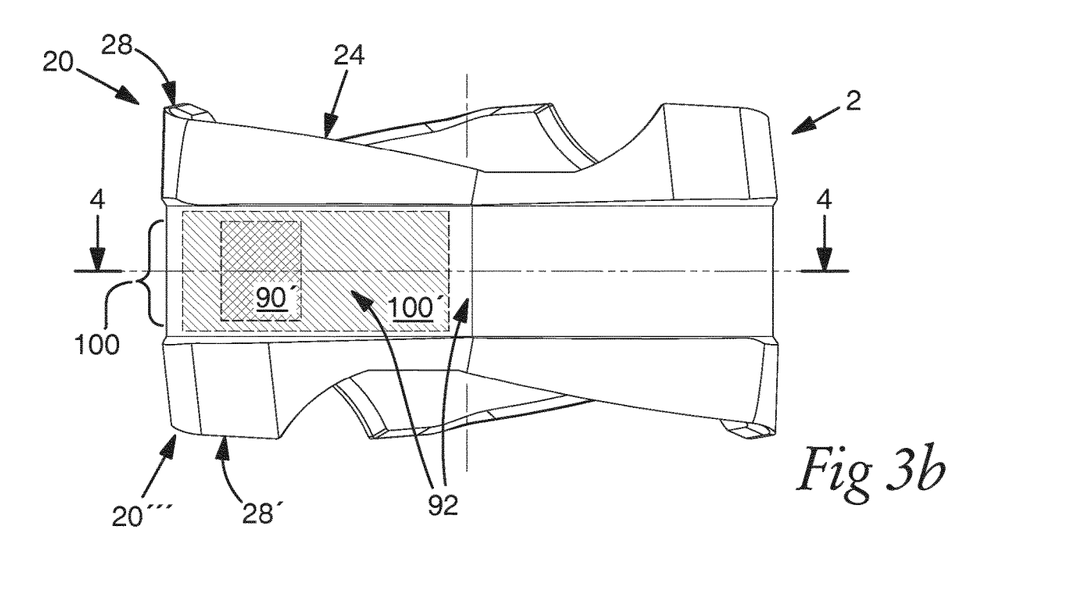

FIGS. 3a and 3b illustrate two different side views of the cutting insert of FIGS. 1a-1e. In particular, the first and second cutting edges 20, 20''' are shown along the median plane 4 from two different sides of the cutting insert 2.

A first flat waist portion 100 of the countersunk circumferential waist portion 92 extends in a plane perpendicularly to the median plane 4 at the first surface-wiping secondary cutting edge 28 and the second main cutting edge 24', see also e.g. FIG. 1a. A second flat waist portion 100' of the countersunk circumferential waist portion 92 extends in a plane at the second surface-wiping secondary cutting edge 28' and the first main cutting edge 24. In FIGS. 3a and 3b the flat first and second waist portions 100, 100' are indicated with hatched areas.

Referring to FIGS. 1a-1e, the first and second main and surface-wiping secondary cutting edges 24, 24', 28, 28' extend along straight lines, seen in the view towards the first and second surfaces 14, 16, respectively. According to the shown embodiment, the first surface-wiping secondary cutting edge 28 extends at an angle d to the first flat waist portion 100, as seen in a view towards the first surface 14, see the highlighted portion FIG. 1b". The second surface-wiping secondary cutting edge 28' extends at an angle d to the second flat waist portion 100', as seen in a view towards the second surface 16, see the highlighted portion FIG. 1c". More precisely, the first and second flat waist portions 100, 100' are extending in relation to the first and second surface-wiping secondary edges 28, 28' to become more countersunk toward the corner 22 of the cutting insert 2. The first surface-wiping secondary cutting edge 28 is arranged outside the countersunk circumferential waist portion 92 and the first flat waist portion 100, as seen in the view towards the first surface 14, see FIG. 1b. Specifically, in the highlighted portion FIG. 1b" the countersunk circumferential waist portion 92 is indicated with a broken line in relation to the first surface-wiping secondary cutting edge 28. Namely, in the view towards the first surface 14, the first surface-wiping secondary cutting edge 28 conceals the countersunk circumferential waist portion 92 and the first waist portion 100. The second surface-wiping secondary cutting edge 28' is arranged outside the countersunk circumferential waist portion 92 and the second waist portion 100', as seen in the view towards the second surface 16, see FIG. 1c. Specifically, in the highlighted portion FIG. 1c" the countersunk circumferential waist portion 92 is indicated with a broken line in relation to the second surface-wiping secondary cutting edge 28'. Namely, in the view towards the second surface 16, the second surface-wiping secondary cutting edge 28' conceals the countersunk circumferential waist portion 92 and the second waist portion 100'.

According to the shown embodiments, the angle d may be 0.9 degrees. According to alternative embodiments, the angle d may be within a range of 0.5-1.5 degrees. As discussed above, when the first surface-wiping secondary cutting edge 28 is positioned for cutting engagement with a workpiece, the second main cutting edge 24', positioned behind the first surface-wiping secondary cutting edge 28, is arranged inside the countersunk circumferential waist portion 92 and accordingly, protected behind the countersunk circumferential waist portion 92 in case of cracks or fractures of the surface-wiping secondary cutting edge 28, 28'.

According to an embodiment, the first main cutting edge 24 extends at an angle e to the second flat waist portion 100', as seen in a view towards the first surface 14, see the highlighted portion FIG. 1b'. The second main cutting edge 24' extends at an angle e to the first flat waist portion 100, as seen in a view towards the second surface 16, see the highlighted portion FIG. 1c'. In this manner, the first main cutting edge 24 is arranged at a successively greater distance inside the countersunk circumferential waist portion 92 and the first flat waist portion 10 in the direction towards the first corner cutting edge 26. Thus, during cutting with the first cutting edge 20, the first main cutting edge 24 is more supported by a body of the cutting insert 2 towards the first corner cutting edge 26, where cutting forces on the first main cutting edge 24 and more likely to cause a fracture of the cutting insert. Moreover, the second main cutting edge 24' is arranged at a successively greater distance inside the countersunk circumferential waist portion 92 and the first flat waist portion 10 in a direction towards the second corner cutting edge 26'. Thus, during cutting with the first cutting edge 20, the second main cutting edge 24' is more protected being the countersunk waist portion 92 towards the second corner cutting edge 26', where cutting forces on the first surface-wiping secondary cutting edge 28 are more likely to cause a fracture of the cutting insert, than at a distance from the second corner cutting edge 26'.

According to the shown embodiment, the angle e may be 0.8 degrees. According to alternative embodiments, the angle e may be within a range of 0.5-1.5 degrees.

The cutting insert 2 is a double-sided and six times indexable cutting insert. Accordingly, the cutting insert 2 comprises in total three cutting edges 20, 20', 20" of the same kind as the first cutting edge 20 extending along the intersection between the first surface 14 and the circumferential surface 18. Also, three cutting edges 20''', 20'''', 20$^V$ of the same kind as the second cutting edge 20''' extend along an intersection between the second surface 16 and the circumferential surface 18. Since the main cutting edge of each of the six cutting edges 20-20$^V$ is arranged inside the relevant countersunk circumferential waist portion 92, each of the six cutting edges 20-20$^V$ is useable even if the cutting edge on the opposite side of the cutting edge should wear down and crack.

Referring to FIGS. 3a and 3b, according to the shown embodiment, the first flat waist portion 100 comprises or forms a first abutment surface 90 configured for abutment against an axial and/or radial support surface of the shoulder milling tool. The second flat waist portion 100' also comprises or forms a second abutment surface 90' configured for abutment against an axial and/or radial support surface of the shoulder milling tool. Thus, the cutting insert 2 is configured to be axially and/or radially supported in the insert seat of the shoulder milling tool by the axial and/or radial support surfaces thereof abutting against the first and/or second flat abutment surfaces 90, 90' of the first and second flat waist portions 100, 100', when the indexable cutting edges 20', 20", 20'''', 20$^V$ are arranged to be active in the insert seat for cutting engagement with the workpiece. See also below with reference to FIGS. 4a, 4b, and FIG. 5.

The first and second flat waist portions 100, 100' extend at a 90 degree angle to each other at the first cutting edge 20. Thus, also the first and second flat abutment surfaces 90, 90' extend at a 90 degree angle to each other.

The first and second flat abutment surfaces 90, 90' are well protected at the first and second flat waist portions 100, 100', i.e. within the countersunk circumferential waist portion 92, during cutting with the cutting insert 2 in the shoulder milling tool. In FIGS. 3a and 3b an example of the first and second flat abutment surfaces 90, 90' are indicated with cross-hatchings. The first and second abutment surfaces 90, 90' form part of the first and second flat waist portions 100, 100' and in practice, the first and second flat abutment surfaces 90, 90' may not be distinguishable from a remainder of the first and second flat waist portions 100. 100'. The first and second flat waist portions 100, 100' form recesses in the insert 2 at the median plane 4. In other words, the first and second flat abutment surfaces 90, 90' along the first main cutting edge 24 and the second surface-wiping secondary cutting edge 28', and along the second main cutting edge 24' and the first surface-wiping secondary cutting edge 28 are countersunk in relation to the first and the second clearance surfaces 50, 50'.

Figure 4A:
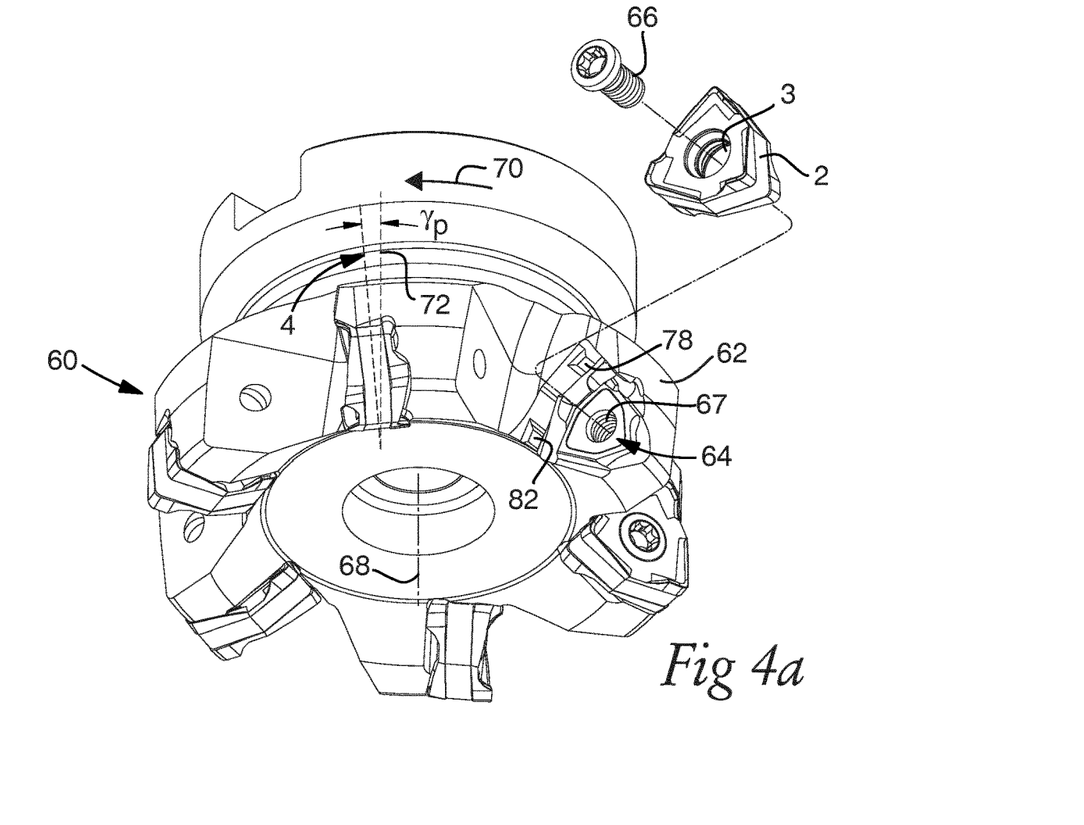
Figure 4B:
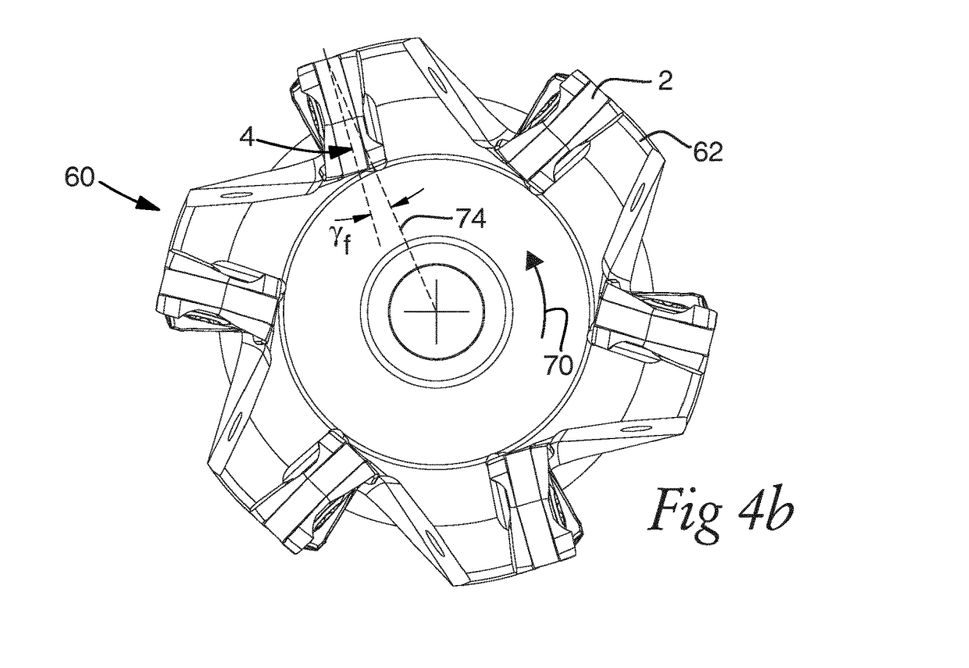

FIGS. 4a and 4b illustrate a shoulder milling tool 60 according to an embodiment. The shoulder milling tool 60 comprises a tool body 62 being provided with an insert seat 64 for receiving the cutting insert 2 described above. The shoulder milling tool 60 comprises the cutting insert 2 arranged in the insert seat 64. The cutting insert 2 is secured to the tool body 62 in the insert seat 64 by means of a screw 66 extending through the through hole 3 of the cutting insert 2. The screw 66 engages with internal threads 67 in the tool body 62. Other means of securing the cutting insert 2 to shoulder milling tool 60 may be used.

The shoulder milling tool 60 is typically provided with more than one cutting insert 2. In this embodiment, the shoulder milling tool 60 comprises six cutting inserts 2 arranged in six insert seats 64 of the tool body 62. The shoulder milling tool 60 is rotatable about a central rotation axis 68 in a direction indicated by the arrow 70, wherein the cutting insert 2 is mounted for cutting into a workpiece with the main cutting edge extending in the axial direction and the surface-wiping secondary cutting edge extending in the radial direction of the shoulder milling tool. The shoulder milling tool 60 can also be used for plunge milling, i.e. milling in the axial direction of the shoulder milling tool 60. Mentioned purely as an example, the shoulder milling tool 60 may have a diameter within a range of 32-250 mm. Obviously, the number of insert seats and cutting inserts 2 may vary depending on for instance the diameter of the shoulder milling tool and/or the operating conditions, such as e.g. operational stability, power consumption and workpiece material.

According to the shown embodiment, the insert seat 64 is configured to provide a negative axial rake angle γp for the median plane 4 of the cutting insert 2 arranged in the insert seat 64. The insert seat 64 is hereby configured to provide a negative axial rake angle γp within a range of 1-11 degrees, more precisely 4-8 degrees, or of approximately 6 degrees. The negative axial rake angle γp is measured between the median plane 4 of the cutting insert 2 and a line 72 extending in parallel with the rotation axis 68 (the axial direction of the shoulder milling tool) and provides an axial clearance between the clearance surface of the surface-wiping secondary cutting edge and the workpiece during milling.

According to the embodiment, the insert seat 64 is also configured to provide a negative radial rake angle γf for the median plane 4 of the cutting insert 2 arranged in the insert seat 64. The insert seat 64 is configured to provide a negative radial rake angle γf within a range of 8-20 degrees, more precisely 11-17 degrees, or of approximately 14 degrees. The negative radial rake angle γf is measured between the median plane 4 of the cutting insert 2 and a radially extending line 74 from the rotation axis 68 (the radial direction of the shoulder milling tool). In combination with the nominal negative clearance angle α of the main cutting edge 24, discussed above with reference to FIGS. 2b and 2c, a functional positive clearance angle of the main cutting edge is formed by the radial rake angle γf. For instance, the exemplified negative clearance angle α of approximately 5 degrees and the negative radial rake angle γf of approximately 14 degrees provides a functional clearance angle of the main cutting edge of approximately 9 degrees.

Figure 5A:
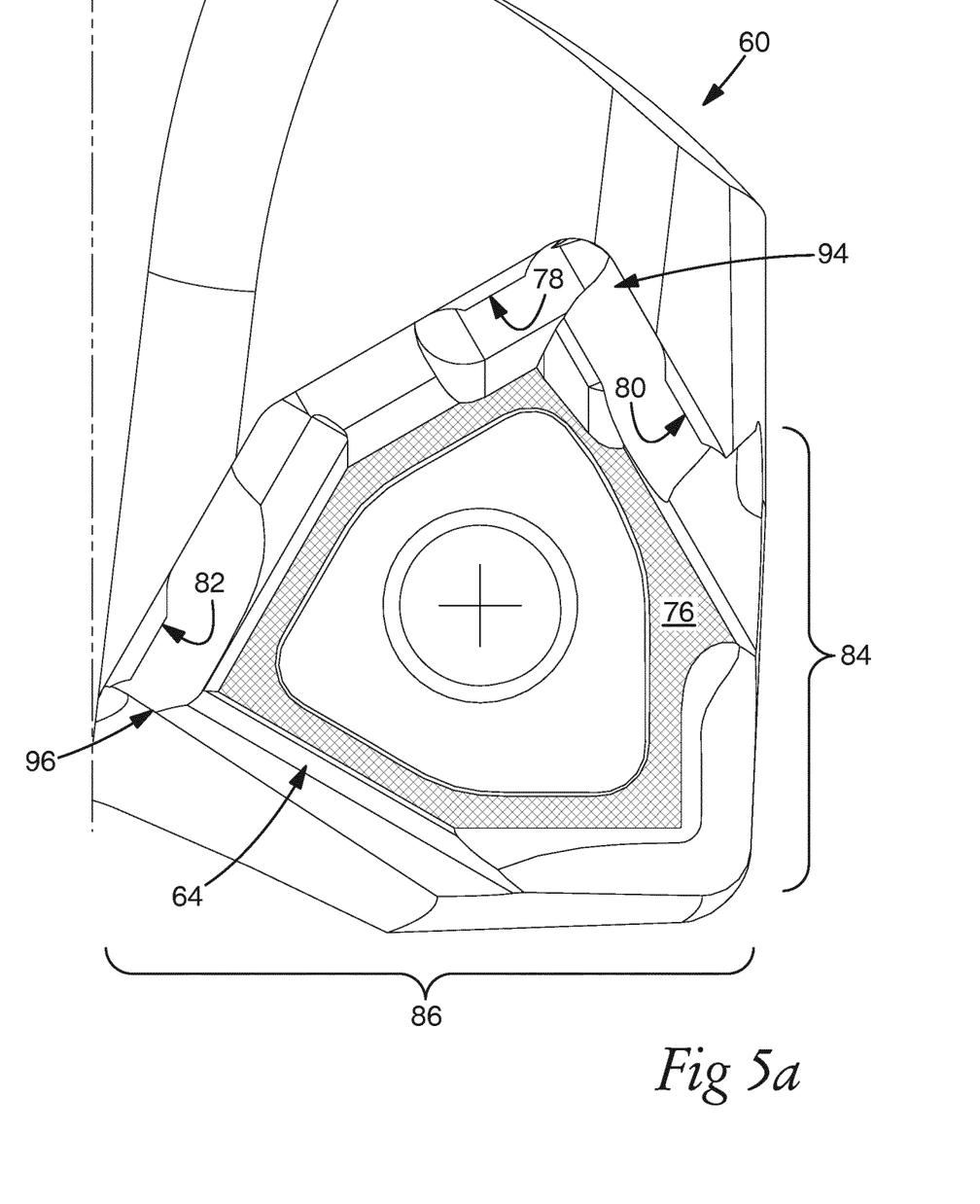
FIG. 5a illustrates an insert seat of the shoulder milling tool of FIGS. 4a and 4b, and FIGS. 5b-5d illustrate the insert seat of the shoulder milling tool of FIGS. 4a and 4b with a cutting insert arranged in the insert seat.

FIG. 5a illustrates an insert seat 64 of the shoulder milling tool 60 of FIGS. 4a and 4b. The insert seat 64 is provided with a bottom support surface 76, a first side support surface 78, a second side support surface 80, and a third side support surface 82. The first and second side support surfaces 78, 82 are also shown in FIG. 4a. The bottom support surface 76 is shown as a cross-hatched surface in FIG. 5. As can be seen, the bottom support surface 76 provides a raised peripheral portion at a bottom of the insert seat 64 for stably supporting at the periphery of the flat centre surface 44 of the cutting insert 2, see FIGS. 1a-1c. The insert seat 64 obviously comprises a radial opening 84 for exposing the active main cutting edge of the cutting insert, when secured in the insert seat 64, and an axial opening 86 for exposing the active surface-wiping secondary cutting edge of the cutting insert.

The first support surface 78, the second support surface 80, and the third support surface 82 are arranged at a 90 degree angle to the bottom support surface 76. The first and second support surfaces 78, 80 are arranged at a 90 degree angle to each other at an end of the insert seat 64 opposite to the axial opening 86, and the third support surface 82 is arranged at an end of the insert seat 64 close to the axial opening 86. The first support surface 78 faces towards the radial opening 84. The second support surface 80 faces away from the radial opening 84. The third support surface 82 faces towards the radial opening 84.

Figures 5B, 5C, 5D:
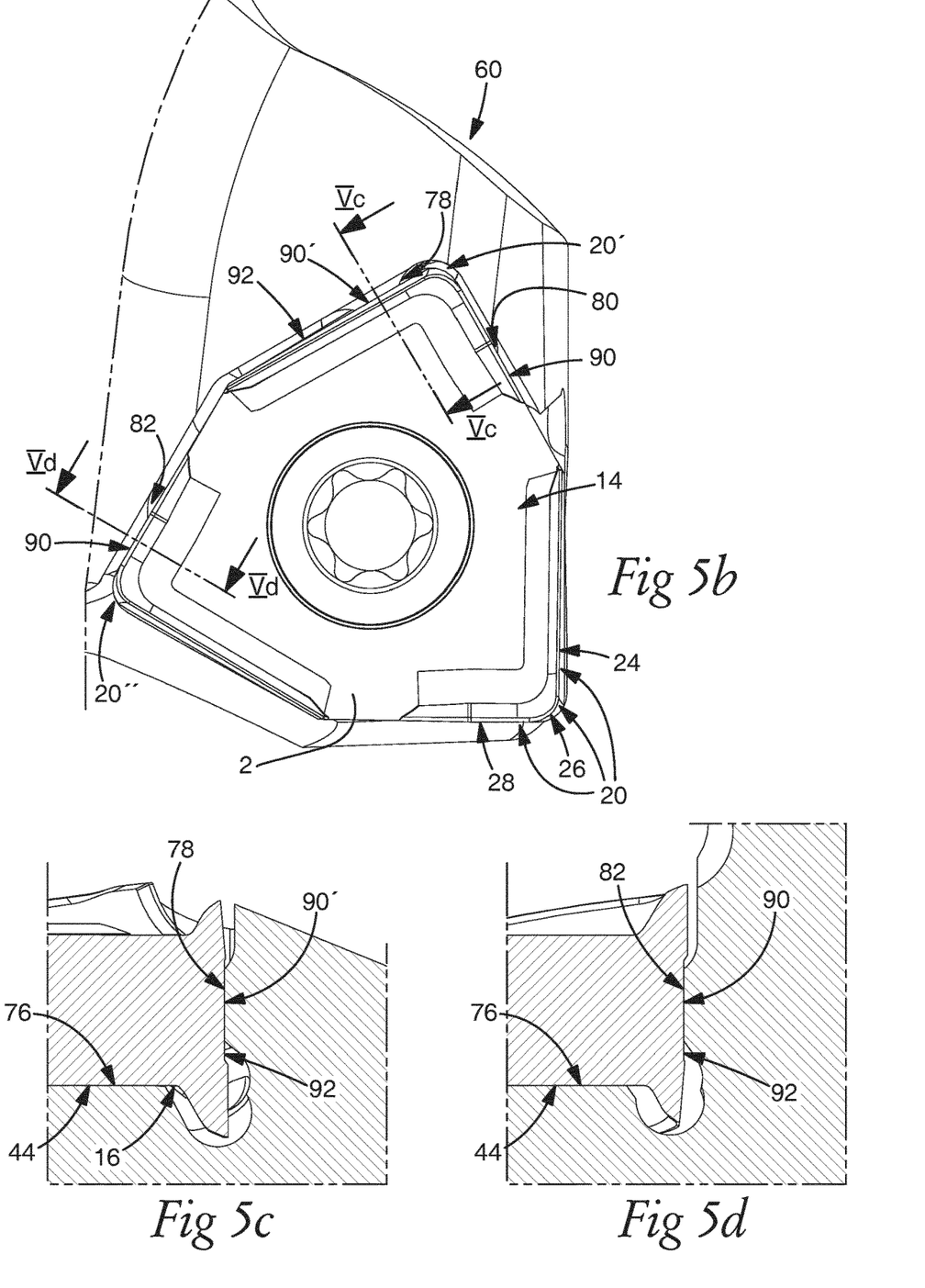

FIGS. 5b-5d illustrate the insert seat 64 of the shoulder milling tool 60 of FIGS. 4a and 4b with a cutting insert 2 arranged in the insert seat 64. FIG. 5c illustrates a cross-section trough the shoulder milling tool 60 along line Vc-Vc in FIG. 5a. FIG. 5d illustrates a cross-section through the shoulder milling tool 60 along line Vd-Vd in FIG. 5a.

The cutting insert 2 is arranged with at least part of the even abutment surface 44, see FIG. 1c, abutting against the bottom support surface 76 of the insert seat 64. Respective first and second abutment surfaces 90, 90' of the cutting insert 2, see FIGS. 3a and 3b, at the inactive cutting edges 20', 20" abut against the first support surface 78, the second support surface 80, and the third support surface 82.

During use of the shoulder milling tool 60, the first and second side support surfaces 78, 80 form axial support surfaces for the cutting insert, the first and third side support surfaces 78, 82 form radial support surfaces for the cutting insert, and the bottom support surface 76 forms a tangential support surface for the cutting insert.

Referring to FIGS. 4a-5d, of the six cutting edges of the cutting insert 2 only one is active or arranged for cutting engagement with the workpiece. Hence, the first cutting edge 20 is arranged for such cutting engagement and is therefore referred to as the active cutting edge. Accordingly, the radial opening 84 exposes the active first main cutting edge 24 and the axial opening 86 exposes the active first surface-wiping secondary cutting edge 28. Naturally, the active first corner cutting edge 26 is also exposed for cutting action with the workpiece. The other two cutting edges 20', 20", at the first surface 14 are arranged in inactive positions. Some of the first and second abutment surfaces 90, 90' at the other two cutting edges 20', 20" abut against the first, second, and third side support surfaces 78, 80, 82. Specifically, the second abutment surface 90' at the first main cutting edge of the inactive cutting edge 20' abuts against the first side support surface 78, see FIG. 5c, and the first abutment surface 90 at the surface-wiping secondary cutting edge of the inactive cutting edge 20' abuts against the second side support surface 80. The first abutment surface 90 at the surface-wiping secondary cutting edge of the inactive cutting edge 20" abuts against the third side support surface 82, see FIG. 5d.

As discussed above, the main cutting edges 24 of the six cutting edges 20-20$^V$ are arranged inside the countersunk circumferential waist portion 92 such that cracks in the main cutting edge 24 of a cutting edge arranged in cutting engagement with a workpiece do not propagate past the countersunk circumferential waist portion 92 to the underlying cutting edge, and such that cracks in the corresponding surface wiping secondary cutting edge of the cutting edge arranged in cutting engagement with the workpiece do not propagate past the countersunk circumferential waist portion 92 to the main cutting edge of the underlying cutting edge.

Since the first and second abutment surfaces 90, 90' at the respective cutting edges 20-20$^V$ are arranged at the countersunk circumferential waist portion, the first and second abutment surfaces 90, 90' are comparatively well protected in case of wear down of the cutting edges 20-20$^V$. Thus, the first and second abutment surfaces 90, 90' may serve as abutment surfaces in the insert seat 64, even if an adjacent cutting edge 20 should have been worn down or ruptured during prior use in an active position in the insert seat 64.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

The invention claimed is:

1. A cutting insert for a shoulder milling tool, the cutting insert comprising:
   a body having a trigonal shape and a median plane extending through the body;
   a first surface, a second surface, and a circumferential surface extending between the first surface and the second surface, the first and second surfaces extending on opposite sides of the median plane;
   a first cutting edge extending along an intersection between the first surface and the circumferential surface; and
   a second cutting edge extending along an intersection between the second surface and the circumferential surface, the first and second cutting edges, as seen in a view towards the first and second surfaces respectively, extending along a corner of the cutting insert, wherein the first cutting edge includes a first main cutting edge, a first corner cutting edge, and a first surface-wiping secondary cutting edge, wherein the first main cutting edge adjoins the first corner cutting edge, and the first corner cutting edge adjoins the first surface-wiping secondary cutting edge, wherein the second cutting edge includes a second main cutting edge, a second corner cutting edge, and a second surface-wiping secondary cutting edge, wherein the second main cutting edge adjoins the second corner cutting edge, and the second corner cutting edge adjoins the second surface-wiping secondary cutting edge, the circumferential surface including a countersunk circumferential waist portion situated at the median plane, and wherein the first main cutting edge is arranged on an opposite side of the countersunk circumferential waist portion to the second surface-wiping secondary cutting edge, and the first surface-wiping secondary cutting edge is arranged on an opposite side of the countersunk circumferential waist portion to the second main cutting edge, and the circumferential surface including a first clearance surface extending along the first main cutting edge, the first clearance surface extending at a first acute angle to the median plane along the first main cutting edge, such that the first clearance surface forms a first negative nominal clearance angle, and a second clearance surface extending along the second main cutting edge, the second clearance surface extending at a second acute angle to the median plane along the second main cutting edge, such that the second clearance surface forms a second negative nominal clearance angle, wherein the first main cutting edge is arranged inside the countersunk circumferential waist portion, as seen in the view towards the first surface, and wherein the second main cutting edge is arranged inside the countersunk circumferential waist portion, as seen in the view towards the second surface.

2. The cutting insert according to claim 1, wherein the first clearance surface along the first main cutting edge extends at the first acute angle that is within a range of 83-87 degrees to the median plane, and wherein the second clearance surface along the second main cutting edge extends at the second acute angle that is within a range of 83-87 degrees to the median plane.

3. The cutting insert according to claim 1, wherein a first flat waist portion of the countersunk circumferential waist portion extends in a plane perpendicularly to the median plane at the first surface-wiping secondary cutting edge and the second main cutting edge, and wherein a second flat waist portion of the countersunk circumferential waist portion extends in a plane perpendicularly to the median plane at the second surface-wiping secondary cutting edge and the first main cutting edge.

4. The cutting insert according to claim 3, wherein the first surface-wiping secondary cutting edge extends at a first angle to the first flat waist portion, as seen in a view towards the first surface, wherein the second surface-wiping secondary cutting edge extends at a second angle to the second flat waist portion, as seen in a view towards the second surface, in such a way that the first and second flat waist portions in relation to the first and second surface-wiping secondary edges become more countersunk toward the corner of the cutting insert.

5. The cutting insert according to claim 3, wherein the first main cutting edge extends at a first angle to the second flat waist portion, as seen in a view towards the first surface, and wherein the second main cutting edge extends at a second angle to the first flat waist portion, as seen in a view towards the second surface in such a way that the first main cutting edge is arranged at an increasing distance inside the second flat waist portion in a direction towards the first corner cutting edge, and the second main cutting edge is arranged at an increasing distance inside the first flat waist portion in a direction towards the second corner cutting edge.

6. The cutting insert according to claim 1, wherein the cutting insert includes three cutting edges, which are the same as the first cutting edge, extending along the intersection between the first surface and the circumferential surface, and three cutting edges, which are the same as the second cutting edge, extending along an intersection between the second surface and the circumferential surface.

7. The cutting insert according to claim 3, wherein the first flat waist portion includes a first abutment surface configured for abutment against an axial and/or radial support surface of the shoulder milling tool, and wherein the second flat waist portion includes a second abutment surface configured for abutment against the axial and/or radial support surface.

8. A shoulder milling tool comprising:
a tool body including an insert seat; and
a cutting insert according to claim 1 arranged in the insert seat.

\* \* \* \* \*